United States Patent [19]

Miskin

[11] 3,724,634
[45] Apr. 3, 1973

[54] BALED HAY LOADING MACHINE
[76] Inventor: Richard B. Miskin, Ucon, Idaho 83454
[22] Filed: Aug. 28, 1970
[21] Appl. No.: 67,771

Related U.S. Application Data

[62] Division of Ser. No. 769,767, July 31, 1968, Pat. No. 3,667,779.

[52] U.S. Cl. ................................198/7 BL, 198/173
[51] Int. Cl. .............................................B65b 65/02
[58] Field of Search............198/7 BL, 11, 13; 214/42

[56] References Cited

UNITED STATES PATENTS

| | | | |
|---|---|---|---|
| 2,397,570 | 4/1946 | Smoker | 198/7 BL |
| 2,460,441 | 2/1949 | Appel | 198/7 BL |
| 2,400,086 | 5/1946 | Hansen | 198/7 BL |
| 2,442,267 | 5/1948 | Eksergian | 198/7 BL |
| 3,297,142 | 1/1967 | Edwards | 198/7 BL |

FOREIGN PATENTS OR APPLICATIONS 530,703  9/1956  Canada..............................198/7 BL Primary Examiner—Gerald M. Forlenza
Assistant Examiner—John Mannix
Attorney—Lawrence J. Winter

[57] ABSTRACT

The present invention relates to a hay loading machine with an upper platform that extends rearwardly and with drive means for loading bales of hay and the like upwardly and then rearwardly along the rear of the platform. The extra long platform and elevator chain means provide means for accumulation of bales along the length of the truck bed waiting for a worker to carry them to desired positions on the truck bed.

4 Claims, 6 Drawing Figures

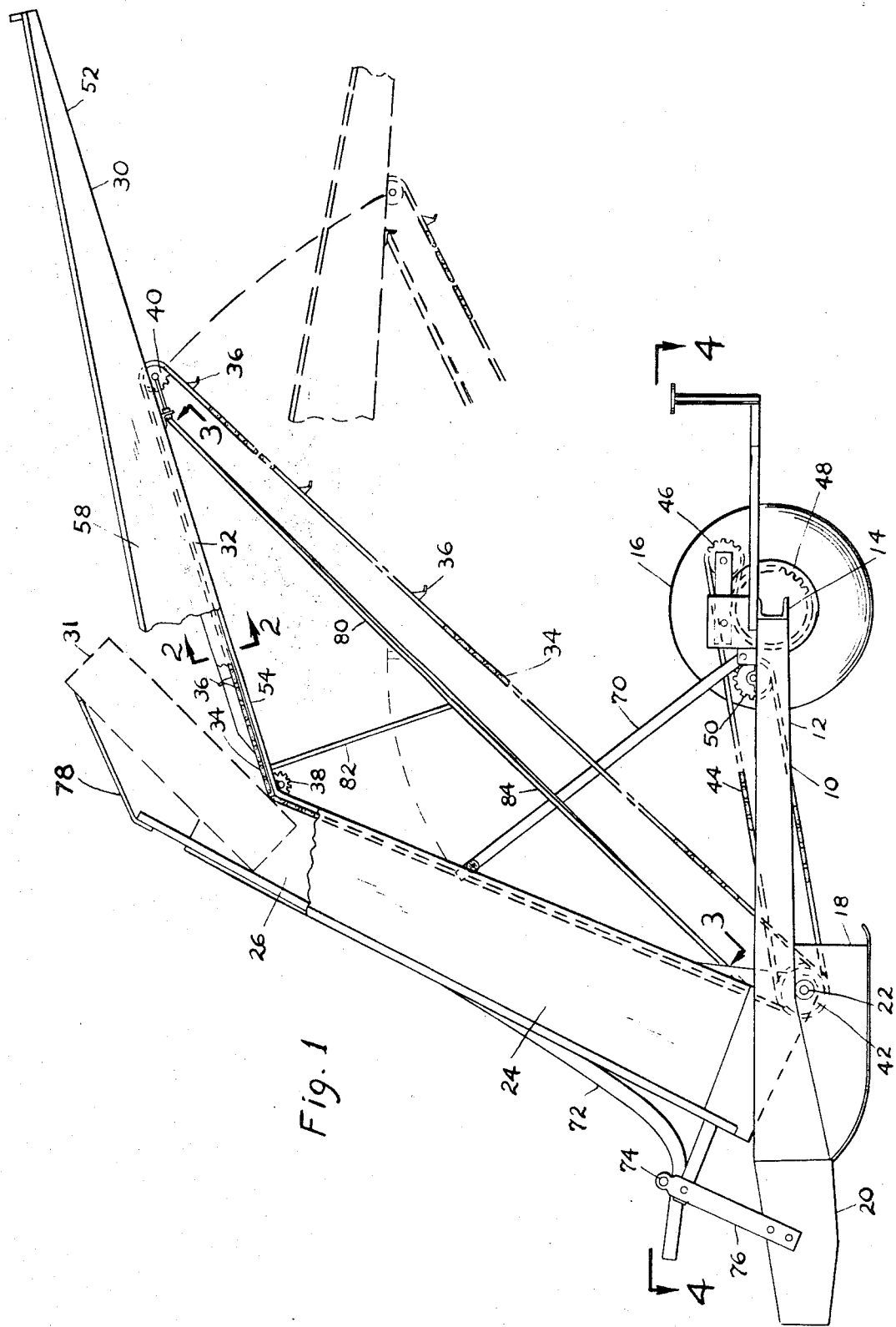

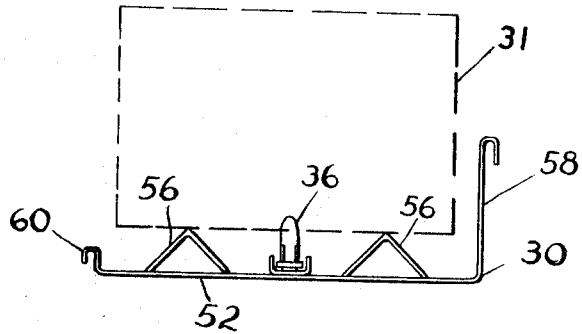
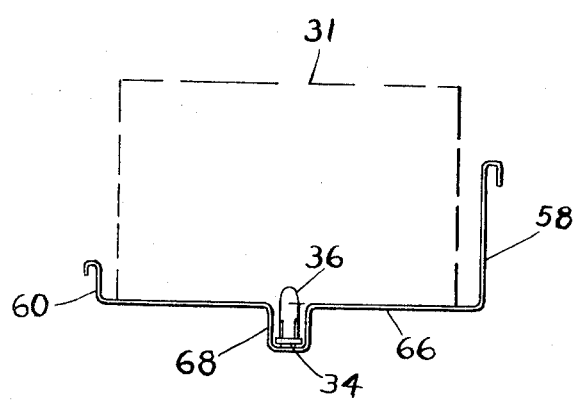
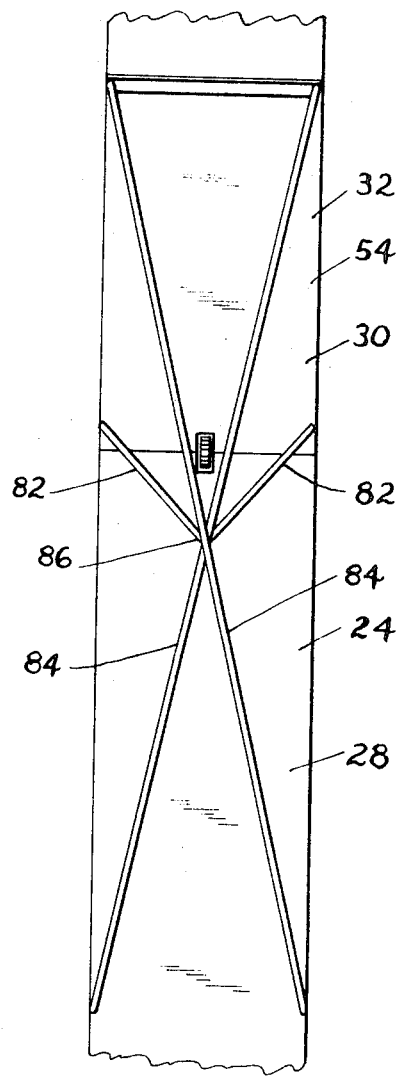

Richard B. Miskin, INVENTOR.

BALED HAY LOADING MACHINE

The present invention is a division of my pending application, Ser. No. 769,767, filed July 31, 1968 now U.S. Pat. No. 3,667,779.

The present invention relates to a machine for handling bales of hay and the like, and more particularly to a machine utilized for loading the bales of hay from the ground to a vehicle such as a truck or the like for transportation to another location.

It is an object of the present invention to provide a machine for handling baled hay which elevates the bales of hay from a position on the ground to a raised position along side of a truck platform so that the worker can lift the bales of hay or load them onto the truck.

It is another object of the present invention to provide a bale loading machine that is provided with an elevator section which moves or lift the bales of hay in a substantially vertically inclined direction, and thereafter moves the bales of hay in a substantially horizontally inclined direction.

It is yet another object of the present invention to provide a bale handling machine that has a conveyor or elevator section and a platform section with conveying means for positively moving the bales of hay along the elevator section and for positively moving the bales of hay a substantial distance along the platform section and which machine further has a platform section disposed adjacent the rear of the first mentioned platform section that has no positive conveyor means thereon, but is of a sufficient length so as to allow the bales of hay to be stored thereon by accumulation, by the bales of hay leaving the conveyor portion of the platform forcing the bales of hay that have left this conveyor section of the platform toward the rear of the nonconveying portion of this platform.

It is another object of the present invention to provide a hay loading device that has an upper platform that extends from substantially the front of the truck deck rearwardly and parallel to a substantial length of the side of the truck so that the upper platform can act as a continuation of the elevator portion of the machine.

In accordance with the present invention the platform portion of the bale loader machine is provided with drive means that move the bales of hay along the platform section of the loader device, more than half the length of the platform section of the device. The remaining portion of the platform section of the device further provides means for storage of the bales along the length of the truck bed while they are waiting for the worker to position them at the desired locations on the truck bed. This result is accomplished because when the bale reaches the end of the conveyor section of the platform, the next successive bales of hay being moved along the platform section will move or force the bales of hay that have been discharged from the moving section of the platform along the non-moving section of the platform so as to force them toward the rear of the platform.

It is another object of the present invention to provide finger means so disposed adjacent the conveyor or elevator section of the loading machine of the present invention that they will cause the bales of hay to be moved into a proper position on the platform for traveling toward the rear of the platform and the truck along side of which the platform is disposed.

It is yet another object of the present invention to provide a baled hay loading machine that has means for adjusting the height of the platform for quick and easy access to the bales of hay on the platform with respect to the worker on the truck platform who handles the bales of hay.

It is another object of the present invention to provide a hay loading machine with means for pivoting the machine about its front end for raising and lowering the platform to the desired height.

It is yet another object of the present invention to provide easy and convenient control means for raising the platform by the utilization of a windlass type spool means rotating on a shaft of an outermost sprocket wheel and a rope of a block and tackle looped around the windlass spool as described in my patent application Ser. No. 610,977, filed Jan. 23, 1967 U.S. Pat. No. 3,467,265. The present invention is provided with a height holding brace that is manually swung away from the elevator portion of the device when it is desired to lower the platform.

It is yet another object of the present invention to provide a bale loading machine or device provided with a plurality of tines or lugs for pulling the bales of hay up the conveyor section of the loading device, which lugs take only a small bite into the bales of hay when they are being moved along the horizontally inclined section of the platform in order to prevent damage to the bales and to the loading machine should the bales become blocked or jammed due to an over-accumulation on the rear platform section of the machine. Thus the present invention provides means for moving the bales of hay with a sufficient force when they are being lifted in a vertically inclined direction, by utilizing lug means that take a deeper bite into the bale of hay, and thereafter providing means to take only a small bite in the bales when they are moving along the horizontally inclined platform, in order to prevent damage to the bales.

It is another object of the present invention to provide a bale loader device having means to give the elevator platform assembly sufficient rigidity so as to prevent it from swinging from side to side.

It is yet another object of the present invention to provide a hay loading device with means for attaching it to a vehicle so as to give safe and complete control of the loading machine along side of the vehicle under any circumstances with facility in hooking and detaching the device from the truck or vehicle.

Various other objects and advantages of the present invention will be readily apparent from the following detailed description when considered in connection with the accompanying drawings forming a part thereof, and in which:

FIG. 1 is a side elevational view of the bale loader device of the present invention shown with portions broken away for purposes of illustration and with a portion in dash lines illustrating the device disposed in a lower position;

FIG. 2 is a section taken along the lines 2—2 of FIG. 1 illustrating the upper forward end of the platform with the conveying means thereon;

FIG. 2A is a view similar to FIG. 2 but illustrating a modification of the invention;

FIG. 3 is a bottom plan fragmentary view taken along line 3—3 of FIG. 1 illustrating the bracing means embodied in the present invention;

Figure 4:
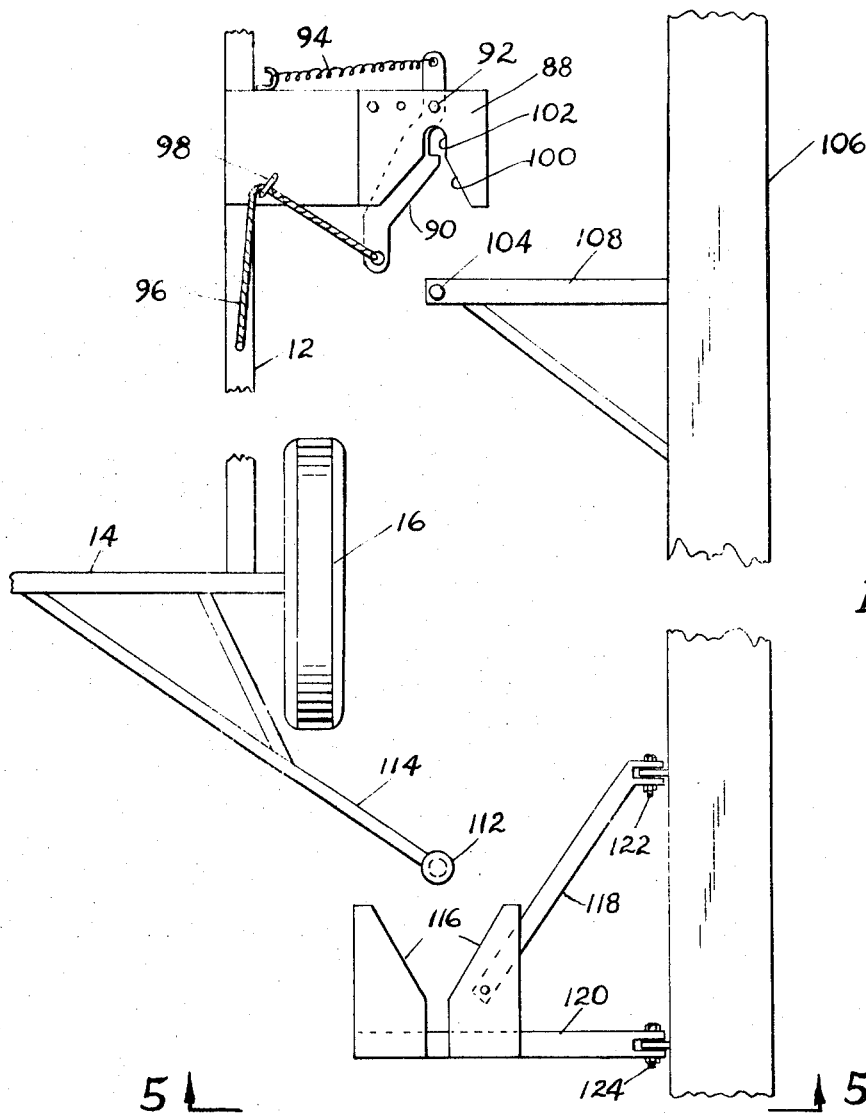
FIG. 4 is a top plan view taken along the line 4—4 of FIG. 1 illustrating the method of attaching the bale loader device to a vehicle or truck.

Referring to the drawings the reference numeral 10 generally designates the bale loader machine or device of the present invention which is provided with a lower horizontal frame having two spaced longitudinal members 12 connected to one another by transverse members including a rear transverse member 14. A wheel 16 for supporting the frame is suitably connected by any well known means to an axle and the transverse member 14 adjacent the side of the loader device that is located next to a truck chasis, as best seen in FIG. 4.

The front end of the members 12 are provided with downwardly extending plates 18 and the members 12 are enlarged adjacent the front end as indicated at 20. The plates 18 and the enlarged ends 20 are positioned so as to guide a bale of hay therebetween so that it can be raised on the loader device as hereinafter described.

A transverse shaft 22 extends between the plates 18 and are suitably secured thereto by any well known means. The shaft 22 carries a substantially vertically inclined conveyor or elevator section 24 which is pivotally connected so as to pivot or rotate about the shaft 22. The elevator section 24 is provided with opposite side walls 26 and a bottom 28 as best seen in FIG. 3. The side walls and the bottom of the elevator form a guideway for lifting a bale of hay from a position between the enlarged ends 20 and the plates 18 upwardly to a higher level. Adjacent the upper end of the elevator 24 is a platform 30 which extends in a substantially inclined horizontal direction rearwardly of the substantially vertically inclined elevator section 24. The platform section 30 is of a substantially greater length than the elevator portion 24 and is designed to extend substantially the entire length of the portion of the vehicle platform upon which the bales of hay are to be loaded.

The bales of hay such as the bale of hay 31 shown in dotted lines on the upper end of the elevator 24 is moved upwardly in a substantially vertically inclined direction and then in a substantially horizontally inclined direction by an endless sprocket chain 34 running along the middle length of the elevator 24 and the middle length of the conveyor section 32 of the platform 30. The endless sprocket chain 34 is triangular shape and is provided with a plurality of spaced pusher members or tines or lugs 36. The endless chain is carried by a sprocket member disposed on the shaft 22 and a sprocket 38 suitably connected to the section 32 of the platform and another sprocket 40 suitably connected to the rear portion of the platform 30. The endless sprocket chain 34 is fixed to rotate with the shaft 22 which is disposed in suitable bearings and the shaft 22 is driven by a sprocket wheel 42 and an endless sprocket chain 44 having its rear end suitably carried by sprocket members 46, 48 and 50 connected to the frame by any well known means. The sprocket chain 44 may be driven by any well known means such as a power take-off not shown that is connected to the vehicle engine.

Referring to FIG. 1 it will be noted that the sprocket chain 34 extends substantially beyond the midpoint of the length of the platform 30 so that the bales of hay after leaving the vertically inclined elevator section 24 will be positively driven or conveyed along the section 32 of the platform 30. Thereafter as the bales 31 are discharged from the rear end of the sprocket chain 34 at which time they will rest on the nonmovable section 52 of the platform 30, the delivery of successive bales of hay from the section 32 will cause the bale or bales of hay on the section 52 to accumulate or to be pushed or moved toward the rear thereof.

Referring to FIG. 1 it will be noted that the endless chain 34 is disposed on the inner surface of the bottom in between the side walls 26 so as to bite into the bales of hay being lifted upon the elevator 24. However, referring to FIG. 2, it will be noted that as the bales of hay are moved onto the section 32 of the platform 30, the bottom 52 of this section 32 is provided with two spaced triangular rails 56 upon which the bale of hay 31 is supported as the pusher members 36 move along the platform, so that the pusher members 36 do not bite into the bale 31 of hay as they did when they were conveying it in an upward direction on the elevator 24. This structure prevents damage to the bales and jamming of the machine when the section 52 of the platform becomes inadvertently clogged with bales of hay. Since the lugs here do not take a deep bite, as compared to the bite that they took when they were lifting it up the elevator 24, the endless chain will keep moving and will not cause damage to the bales or cause the machine to break. It will also be noted from FIG. 2 that the platform 30 has a side wall 58 of tapering configuration on the side thereof disposed away from the vehicle upon which the bales of hay are to be loaded while the opposite side is provided with a small rim 60 so that the bales can be easily removed therefrom by the worker.

Referring to the modification shown in FIG. 2A this is substantially the same as that already described in connection with FIG. 2, except that the bottom 66 of the conveyor portion of the platform is substantially level and is provided with a recess 68 extending down the middle length of the bottom 66 so as to accommodate the pushers 36 of the endless chain 34 so that they do not bite into the bale 31 as greatly as they do when the bale is being conveyed up the elevator 24.

The height of the elevator 24 and the platform 30 is raised and lowered as described in my co-pending patent application Ser. No. 379,128 filed June 30, 1964, by a windlass type spool rotating on a shaft and a rope of a block and tackle looped around the windlass. Once the predetermined height of the platform is attained, a brace member 70 of well known construction maintains it in that position. The brace 70 may use any suitable means to maintain it in the desired position, such as that described in my co-pending application. Lowering the platform 30 is accomplished by manually swinging the height holding brace member 70 away from the elevator as indicated by the dotted lines in FIG. 1 so that the platform can be lowered to the position shown by dotted lines therein.

The bales of hay are maintained in proper position on the elevator 24 by a pivoting hold down bar 72 pivoted at 74 and supported by a strut 76. The upper end of the bar 72 is provided with resilient fingers 78 so that as the bale moves toward the top of the elevator the fingers will cause it to be pushed down onto the platform before it has time to fall into a wrong position for traveling rearwardly along the conveyor section 32 of the platform.

Referring to FIGS. 1 and 3 it will be noted that the elevator 24 and the platform 30 are prevented from any inclination to swing from side to side by cross-bracing 80 consisting of midstruts 82 and two cross struts 84 connected at their opposite ends to the platform 30 and the elevator 24 as best seen in FIG. 3. It will be noted that the struts 82 and the struts 84 are all welded together at a point indicated at 86 adjacent the midpoint of the struts 84.

Figure 5:
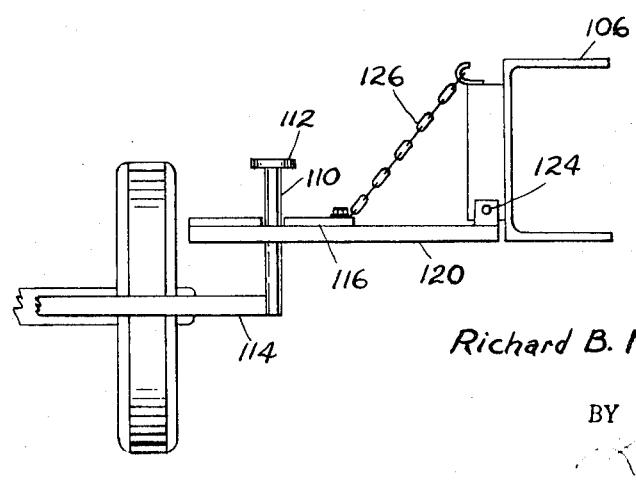
FIG. 5 is a view taken along the line 5—5 of FIG. 4 illustrating the rear end of the loader device attached to the vehicle hitching means.

Referring to FIGS. 4 and 5 the inner longitudinal member 12 is provided with a horizontal plate 88 with a latch member 90 on a pivot pin 92 normally held in a closed position by a biasing spring 94. The latch member 90 is opened by pulling on the rope 96 which passes through the loop 98 on the member 88. The member 88 is provided with inwardly tapered complimentary edges 100 adjacent the pin opening 102 so as to guide the pin 104 on the vehicle frame or chasis 106 therein. The pin 104 is disposed on a horizontal strut 108 extending from the chasis 106.

The transverse rear member 14 of the elevator frame is provided with a vertical pin 110 having a flat extending head 112 with the pin 110 being supported on a brace or strut 114 suitably connected to the member 14 and extending beyond the wheel 16 as shown in the drawings. The pin 110 is disposed to enter the jaws 116 of the plate member that is secured to struts 118 and 120 which are pivotally connected at 122 and 124 to the chasis frame 106. Referring to FIG. 5 the jaws 116 have a chain 126 connected thereto so as to maintain the jaws and the struts 118 and 120 in a horizontal plane. The pivotal connections or the pins 122 and 124 enable the bale loader device to go over uneven terrain, and the horizontal strut 120 and the Y grove can pivot upwardly to prevent any strain upon the latching mechanism. When the vehicle goes over a high spot the chain provides the strength to lift the loader while the pin head 112 prevents the pin from slipping out.

In operation, when it is desired to attach the loader device to the chasis 106 of a vehicle, the vehicle is moved along side the wheel 16 as shown in FIG. 4, and then the vehicle is slowly moved in the direction indicated by the arrow in FIG. 4 so that the pin 104 will enter the hole 102 and be latched in place by the latching member 90 while the pin 110 will move into the Y shaped jaws 116 of the rear latching mechanism. Thus the bale loader is quickly and easily secured in its proper position for use with a vehicle.

From the foregoing description it is apparent that the present invention provides a loader device that has an extra long platform or table connected rearwardly of the elevator and which platform has positive gripping means so that a bale of hay being lifted up a substantially vertically inclined elevator is also moved rearwardly along a substantially horizontally inclined platform, for over half of the length of the inclined platform.

It is also apparent that the present invention provides a long platform in which as the bales of hay are discharged from the conveyor section of the platform, they will cause bales that have been released to be forced or moved rearwardly of the platform.

The present invention further provides means for biting into the bales of hay so as to lift them vertically and thereafter means so that the bales of hay are only bitten into by the tip of the pusher means so that the bales of hay will not be damaged and the machine will not be damaged should the bales of hay inadvertently accumulate on the long rearwardly extending platform disposed on the top rear end of the elevator.

Inasmuch as various changes may be made in the relative arrangement and location of the parts without departing from the spirit and scope of the invention, it is not meant to limit the invention except by the scope of the appended claims.

What is claimed is:

1. A loader device for lifting and conveying bales of hay and the like, comprising a vertically inclined elevator section and a substantially horizontal platform section extending rearwardly of the vertically inclined section and having a common central axis therewith and of greater length than the said vertically inclined section to permit unloading from said horizontal platform section along its entire length, said sections having a bottom, a single endless chain being disposed along said inclined bottom section for its entire length, and along substantially half the length of the platform bottom section, spaced pusher means disposed on said endless chain and extending upwardly therefrom along and above said inclined bottom to dig into bales moved therealong, longitudinally extending rails disposed on said platform bottom section with said endless chain disposed therebetween and being co-extensive therewith, said chain on said platform section extending above said rails a lesser height than the pusher means along said inclined section to provide a gradual withdrawal from said bales moved therealong whereby bales thereon do not become torn.

2. The device of claim 1 wherein said elevator is pivotally connected to the front end of said frame.

3. The device of claim 2 wherein said elevator section is provided with a vertically inclined hold down bar for holding bales against said elevator section, and resilient finger means are disposed on top of a pusher bar adjacent the top of said elevator and extend over the front end of said platform for guiding said bales into a proper position on said platform.

4. The loader device of claim 3 wherein said horizontal section has a short rim means on one side thereof to permit easy unloading of bales along said horizontal section, and an enlarged tapered wall along its opposite side.

* * * * *